(12) United States Patent
Shotey et al.

(10) Patent No.: US 9,106,061 B1
(45) Date of Patent: Aug. 11, 2015

(54) ADJUSTABLE THERMOSTAT COVER WITH DETENTS AND LEVEL

(75) Inventors: Marcus J. Shotey, Scottsdale, AZ (US); Jeffrey P. Baldwin, Phoenix, AZ (US); Samuel Dumpe, Scottsdale, AZ (US); Richard L. Cleghorn, Carlsbad, CA (US)

(73) Assignee: Hubbell Incorporated, Shelton, CT (US)

( * ) Notice: Subject to any disclaimer, the term of this patent is extended or adjusted under 35 U.S.C. 154(b) by 535 days.

(21) Appl. No.: 13/347,535

(22) Filed: Jan. 10, 2012

Related U.S. Application Data

(63) Continuation-in-part of application No. 12/890,488, filed on Sep. 24, 2010, now abandoned, and a continuation-in-part of application No. 12/719,678, filed on Mar. 8, 2010, now abandoned.

(60) Provisional application No. 61/431,659, filed on Jan. 11, 2011, provisional application No. 61/245,362, filed on Sep. 24, 2009, provisional application No. 61/157,960, filed on Mar. 6, 2009, provisional application No. 61/219,855, filed on Jun. 24, 2009, provisional application No. 61/245,368, filed on Sep. 24, 2009.

(51) Int. Cl.
*H02G 3/14* (2006.01)
*B65D 43/22* (2006.01)
*H02G 3/08* (2006.01)
*B65D 43/16* (2006.01)

(52) U.S. Cl.
CPC .............. *H02G 3/081* (2013.01); *H02G 3/14* (2013.01); *B65D 43/164* (2013.01); *B65D 43/22* (2013.01); *B65D 2251/1058* (2013.01)

(58) Field of Classification Search
CPC .................. B65D 2251/10; B65D 2251/1016; B65D 43/164; B65D 2251/1058; B65D 43/22; H02G 3/14; H02G 3/081
USPC ......... 220/210, 840, 4.03, 676, 811–813, 3.8, 220/835; 174/66, 67; 206/308.1
See application file for complete search history.

(56) References Cited

U.S. PATENT DOCUMENTS

| | | | | |
|---|---|---|---|---|
| 2,307,028 | A * | 1/1943 | Dahlgren | 220/283 |
| 4,674,303 | A * | 6/1987 | Salcone, II | 70/63 |
| 5,533,637 | A * | 7/1996 | Williams, Jr. | 220/3.8 |
| 2003/0010664 | A1 * | 1/2003 | Bellin et al. | 206/425 |
| 2006/0016809 | A1 * | 1/2006 | Dinh et al. | 220/3.8 |
| 2013/0192867 | A1 * | 8/2013 | Greaney | 174/66 |

* cited by examiner

*Primary Examiner* — Fenn Mathew
*Assistant Examiner* — James N Smalley
(74) *Attorney, Agent, or Firm* — Michael Best & Friedrich, LLP

(57) ABSTRACT

A thermostat cover includes a base with four walls and an aperture sized such that at least a portion of a thermostat may be received. A lid is slidably mounted on the base at a front side of the base. The lid has a slide member that couples with a slide rail located on the base. In another embodiment, the lid has a slide member that extends from the lid and couples with an extension track located on the base. The extension track is configured in an L-shape such that the lid is collapsible with a first position and a second position. The extension track may have stops that hold the lid in the second position. In another embodiment, the lid is hingedly coupled to the base. A support rod is configured to hold the lid in a raised position.

19 Claims, 7 Drawing Sheets

ADJUSTABLE THERMOSTAT COVER WITH DETENTS AND LEVEL

CROSS REFERENCE TO RELATED APPLICATIONS

This application is a continuation in part application of pending U.S. patent application Ser. No. 12/719,678 to Shotey et al. filed Mar. 8, 2010 and titled "Thermostat Cover", and U.S. patent application Ser. No. 12/890,488 to Shotey et al. filed Sep. 24, 2010 and titled "Low Profile Thermostat Cover", the disclosures of which are hereby incorporated herein entirely by this reference. This application also claims priority to U.S. Provisional Patent Application 61/431,659 entitled "Adjustable Thermostat Cover with Detents and Level" filed Jan. 11, 2011, the disclosure of which is hereby incorporated entirely herein by reference.

BACKGROUND

1. Technical Field

Aspects of this document relate generally to device covers and more specifically to thermostat covers.

2. Background Art

A thermostat is a device used for regulating the temperature of a particular area. With respect to human occupied structures, air conditioning and/or heating units are controlled by a thermostat such that a desired temperature is achieved and maintained.

In public areas, thermostat covers are conventionally used to prevent access to the thermostat by unauthorized people, thus preventing excessive costs that could occur if unauthorized people changed a setting that resulted in an air conditioning or heating system to be used more than expected. The cover is typically placed over the thermostat and locked such that the thermostat cover cannot be removed, preventing changes to the settings of the thermostat. Thermostat covers of the current art are typically configured such that, once removed from the thermostat, the thermostat cover is no longer attached to the wall. Thus a user has to hold the thermostat cover in his hand or place it on another surface in order to manipulate the thermostat controls.

Thermostat covers are well known in the industry. However, thermostat covers are conventionally large and bulky, taking up a considerable amount of room space. Further, thermostat cover manufacturers must produce a variety of covers adapted to fit any number of different sized thermostats.

SUMMARY

One particular implementation of a thermostat cover assembly may include a base having a first wall and a second wall substantially parallel to each other and a third wall and a fourth wall substantially parallel to each other, wherein the third wall and fourth wall are substantially perpendicular to each of the first wall and second wall. The base may also have an aperture in a back side large enough to receive at least a portion of a thermostat therethrough. The first wall and the second wall of the base may also include a plurality of mounting locations and the fourth wall of the base may have a plurality of locking tab locations. The thermostat cover assembly may include a locking tab selectively positionable in one of the plurality of locking tab locations and a lid adjustably mountable on the base at a front side of the base. The lid may also include a first pivot point configured to engage one of the plurality of mounting locations on the first wall of the base and a second pivot point configured to engage one of the plurality of mounting locations on the second wall of the base. The lid may also have a closing member configured to engage the locking tab on the fourth wall of the base.

A particular implementation of the thermostat cover assembly may include one, some, or all of the following:

The plurality of mounting locations in the base may be holes and the first pivot point and second pivot point may each be a raised bump constructed to engage one of the plurality of mounting locations. Another implementation of the first pivot point and second pivot point each may be a peg constructed to engage one of the plurality of mounting locations.

The closing member may have a lock located on the lid, wherein the lock interfaces with the locking tab to prevent movement of the lid when the lock is in a locked position.

The locking tab may also include releaseable clips, wherein the clips are removably insertable into the plurality of locking tab locations.

The locking tab may also include a protrusion with a slot, wherein the closing member engages the slot in the protrusion.

The thermostat cover assembly may also include a mounting plate constructed to secure the thermostat thereto.

The base may further include holes arranged to align with holes in the mounting plate such that mounting screws may traverse both the base and the mounting plate to secure the thermostat cover assembly to a wall.

The thermostat cover assembly may also include a plurality of detents formed in the base.

A particular implementation of thermostat cover assembly may include a level. The level may be included as part of the base or the lid.

A particular implementation of a thermostat cover assembly may include a base having a first wall and a second wall substantially parallel to each other and a third wall and a fourth wall substantially parallel to each other, wherein the third wall and fourth wall are substantially perpendicular to each of the first and second wall. The base may include an aperture in a back side large enough to receive at least a portion of a thermostat therethrough.

The lid may include a first pivot point configured to engage one of a plurality of mounting locations on the first wall of the base and a second pivot point configured to engage one of a plurality of mounting locations on the second wall of the base, the plurality of mounting locations extending at least a portion of a distance between the back side of the base and a front side of the base. The lid may further include a closing member configured to engage one of a plurality of locking tabs on the fourth wall of the base.

The lid may be positionable between a first position wherein the assembly has a first depth and a second position wherein the assembly has a second depth which is greater than the first depth.

The thermostat cover assembly may also include the lid being positionable between the first position wherein the assembly has the first depth and a third position wherein the assembly has a third depth which is greater than the second depth.

Another particular implementation of a thermostat cover assembly may include a base having a first wall and a second wall substantially parallel to each other and a third wall and a fourth wall substantially parallel to each other, further wherein the third wall and fourth wall are substantially perpendicular to each of the first and second wall. The base may also have a closing tab.

The thermostat cover assembly may also include a lid hingedly coupled to the base, wherein the lid has a hinge member configured to couple with a hinge member indent located on each of the first and second walls of the base; and the closing tab is configured to hold the lid in a closed position by interfacing with the base.

The thermostat cover assembly may also include a lock configured to prevent the movement of the lid when in a locked position.

An implementation of a method of selectively enclosing a thermostat of a particular depth with a thermostat cover assembly to a corresponding depth is disclosed. The assembly may include a base, wherein the base has a plurality of connection points, and a lid, wherein the lid has a hinge member. The method may include the steps of: placing the base around the thermostat; selecting one of the plurality of connection points based upon the corresponding depth of the thermostat; coupling the hinge member of the lid to the selected one of the plurality of connection points on the base to selectively enclose the thermostat to a corresponding depth.

In an implementation, the base may also include a plurality of locking tab positions and a locking tab removably insertable into one of the plurality of locking tab locations and wherein the lid may also include a closing member. The method may further include the steps of: selecting one of the plurality of locking tab positions based upon the corresponding depth of the thermostat; inserting the locking tab into the selected one of the plurality of locking tab positions; and coupling the closing member to the locking tab to secure the lid in a closed position.

In an implementation, the base may also include a plurality of detents, and the method may include the additional steps of pressing the base against a wall at a desired mounting location for the thermostat; and drilling mounting holes at the locations of the marks on the wall created by the detents.

In another implementation, the base may also include a level, and the method may include the additional steps of; positioning the base against a wall at a desired mounting location for the thermostat; and using the level to determine a level mounting position before mounting the assembly to a wall.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended DRAWINGS, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for a thermostat cover will become apparent for use with implementations of a thermostat cover from this disclosure. Accordingly, for example, although particular lids, bases, and hinge components are disclosed, such lids, bases, and hinge components and other implementing components may comprise any shape, size, style, type, model, version, measurement, concentration, material, quantity, and/or the like as is known in the art for such implementing components, consistent with the intended operation of a thermostat cover.

Figure 1:
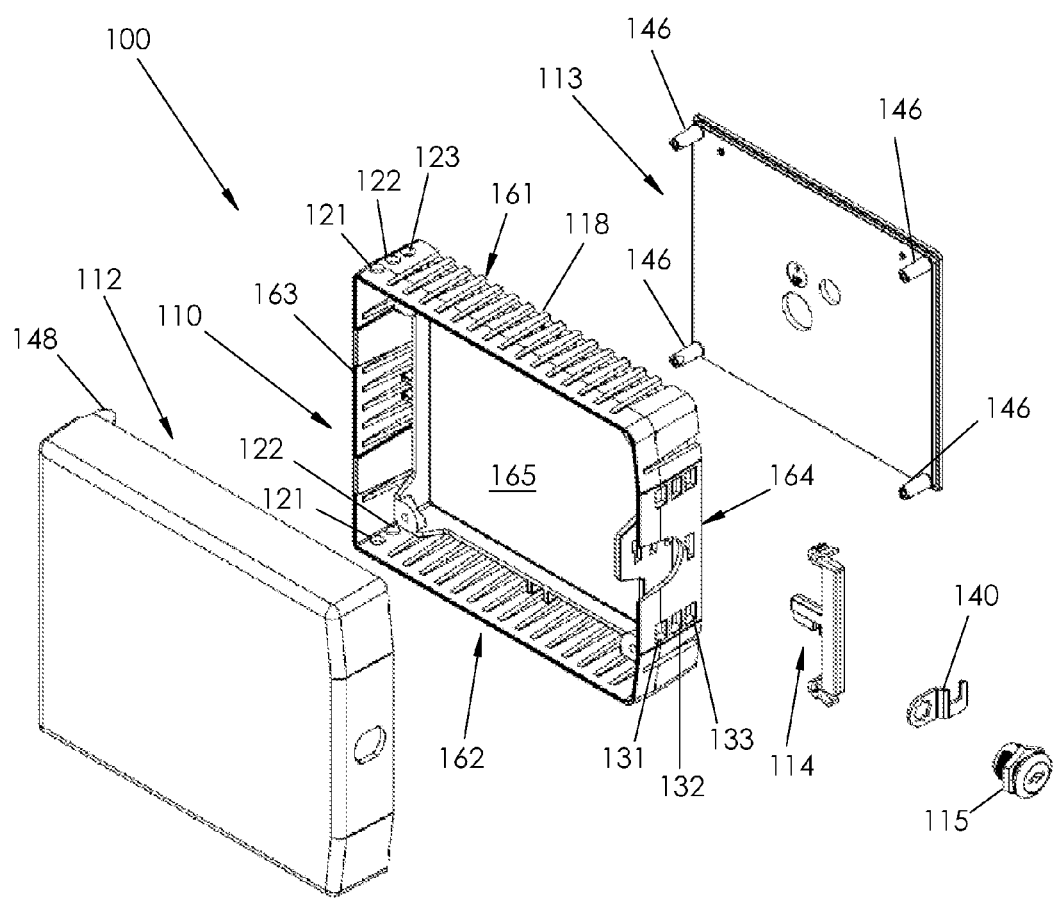
FIG. 1 is an illustration of an exploded view of a thermostat cover.

FIG. 1 illustrates an implementation of a thermostat cover assembly 100 exploded to show the thermostat cover base 110, lid 112, mounting plate 113, locking tab 114, and lock 115. The base 110 may include a plurality of openings 118 for venting, as well as a plurality of mounting holes and locking tab positions. In an implementation of the thermostat cover assembly 100, the mounting holes and locking tab positions are corresponding, as will be described below.

The implementation shown in FIG. 1 includes, for example, a first mounting hole 121, second mounting hole 122, and third mounting hole 123 and a first locking tab position 131, a second locking tab position 132 and a third locking tab position 133. Each of the three mounting holes 121, 122, 123 corresponds to a matching locking tab position 131, 132, 133, respectively. For example, the first mounting hole 121 corresponds to the first locking tab position 131. In this implementation, if the lid 112 is positioned to create the largest opening to allow a larger thermostat to be accommodated in the thermostat cover 100, then the lid 112 would be connected to the base 110 using the in the widest mounting hole, meaning the mounting hole furthest from the mounting plate 113, which would is the first mounting hole 121. Correspondingly, then locking tab position 131, the widest locking tab position, will also be used so that when the lid 112 is in the closed position, the lid 112 can be locked in place with the lock 115. The number of mounting holes illustrated is three; however, other implementations of the thermostat cover assembly 100 could have more or fewer as desired. Similarly, the number of locking tab positions also illustrated is three; however, other implementations of the thermostat cover assembly 100 could have more or fewer as desired.

Figure 6:
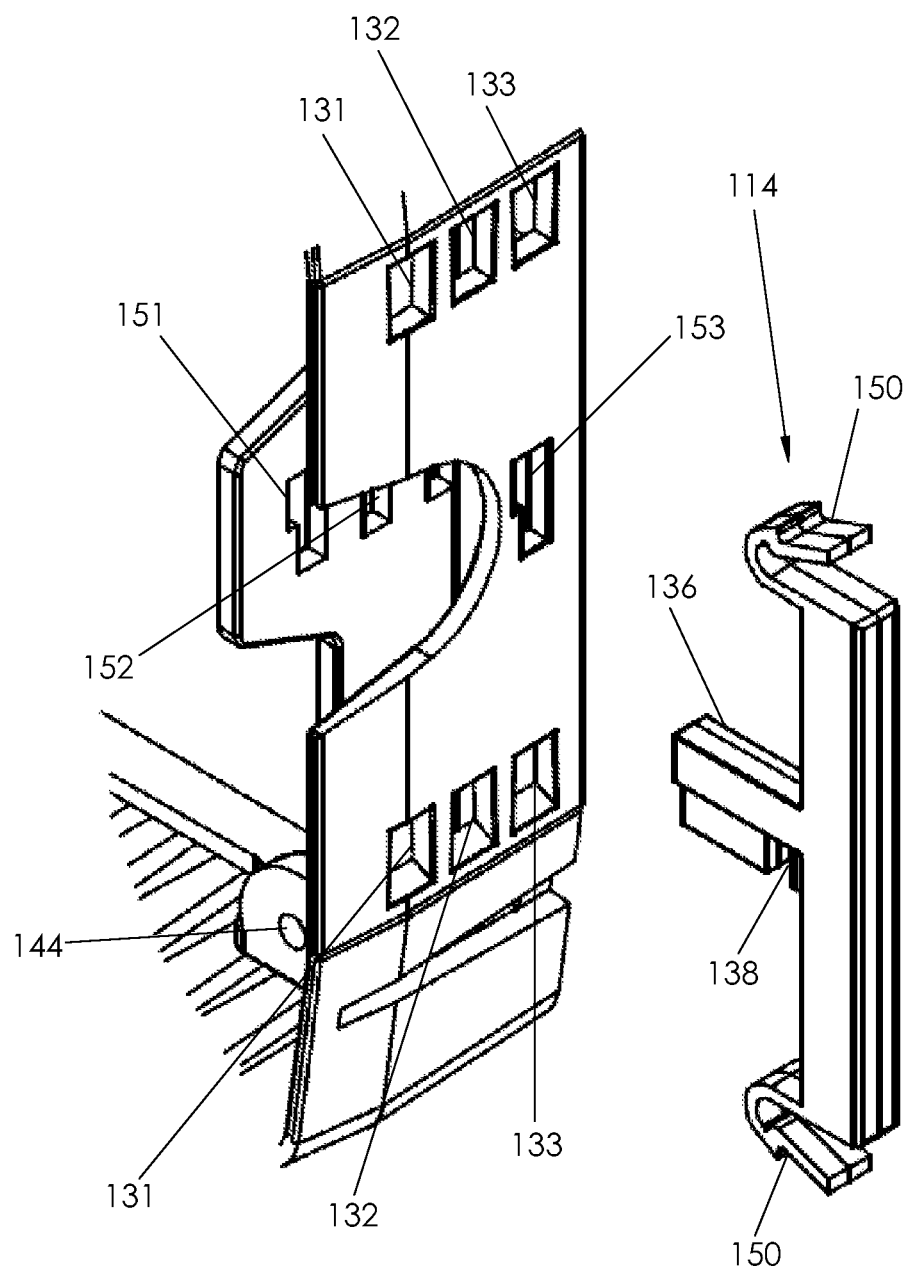
FIG. 6 is an illustration of an enlarged view of the locking tab being installed.

As shown in FIGS. 1, 3, 4 and 6, and with particular detail shown in FIG. 6, the locking tab 114 includes a protrusion 136 with a slot 138 that is arranged to receive a hook portion 140 (see FIG. 1) of the lock 115 when the lock 115 is in a locked condition.

Figure 3:
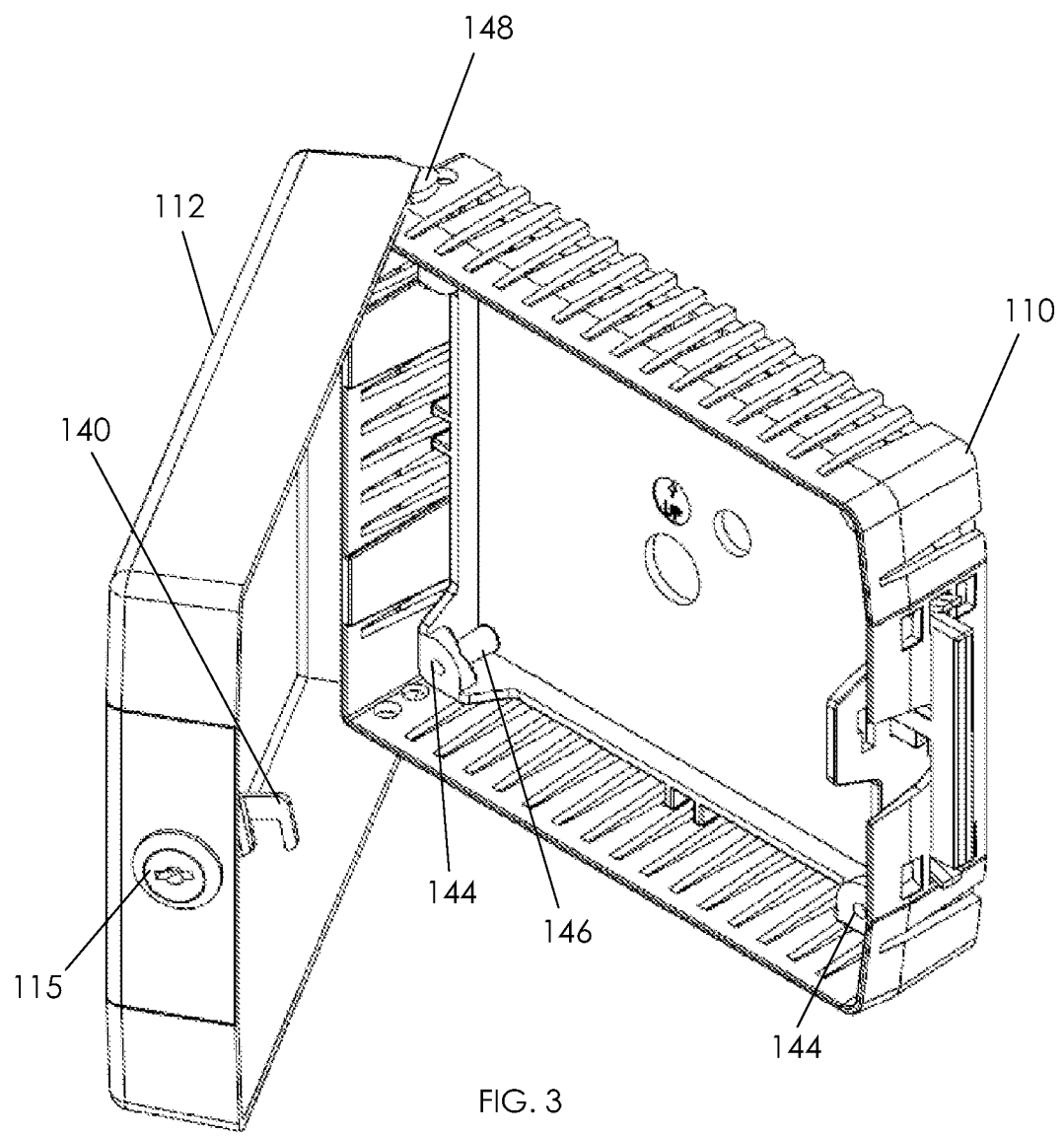
FIG. 3 is an illustration of a perspective view of a thermostat cover in an open position in the middle depth orientation.
Figure 4:
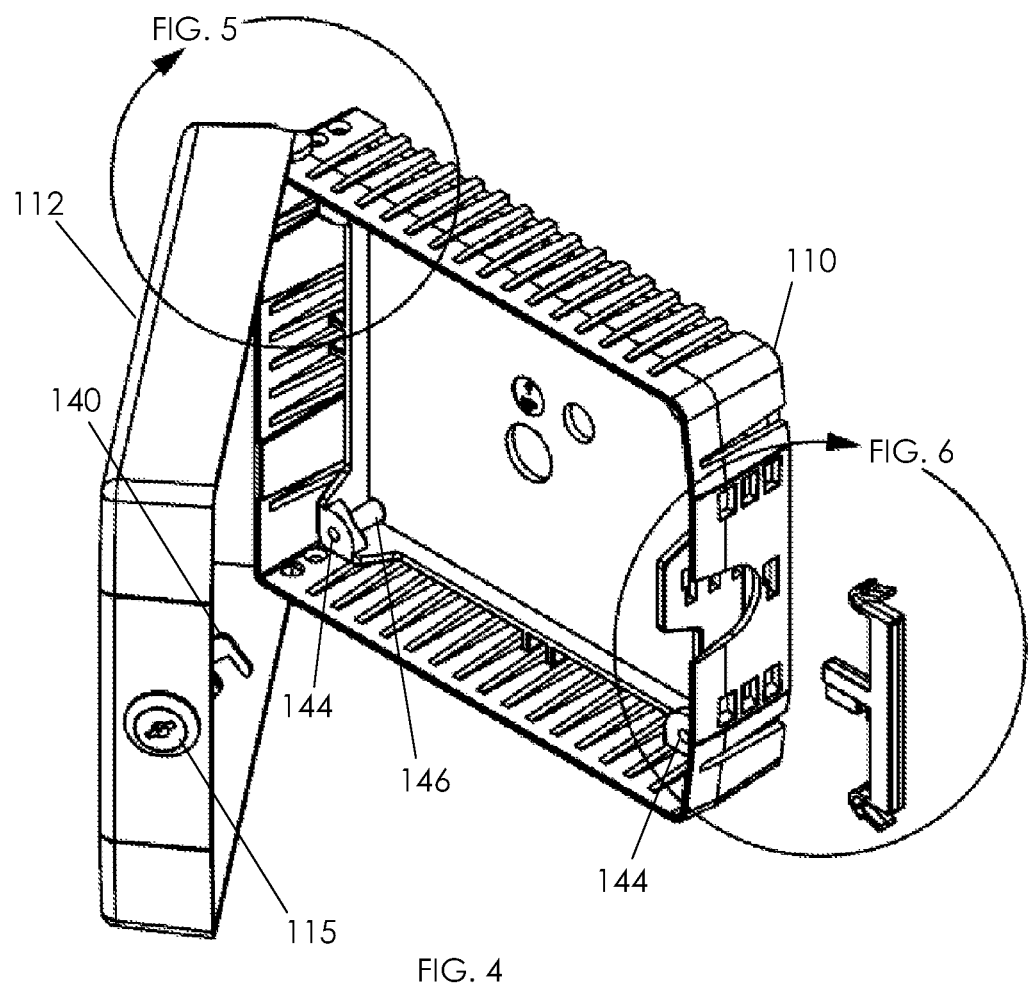
FIG. 4 is an illustration of a perspective view of a thermostat cover in an open position in a widest depth orientation with a locking tab being installed.

As shown in FIGS. 1, 3 and 4, the mounting plate 113 may be removably secured through the back of the base 110 so that a user can secure the thermostat to the mounting plate 113 prior to installing the thermostat cover assembly 100. A set of holes 144 in the base 110 align with holes in standoffs 146 of the mounting plate 113 so that mounting screws may traverse both the holes 144 in the base 110 and holes in the standoffs 146 of the mounting plate 113 to secure the thermostat cover assembly 100 to the wall. The exploded view of FIG. 1 shows the base 110 and the mounting plate 113 separated, while FIG. 3 and FIG. 4 show the base 110 and the mounting plate 113 put together along with the lid 112 to form the thermostat cover assembly 100.

Figure 2:
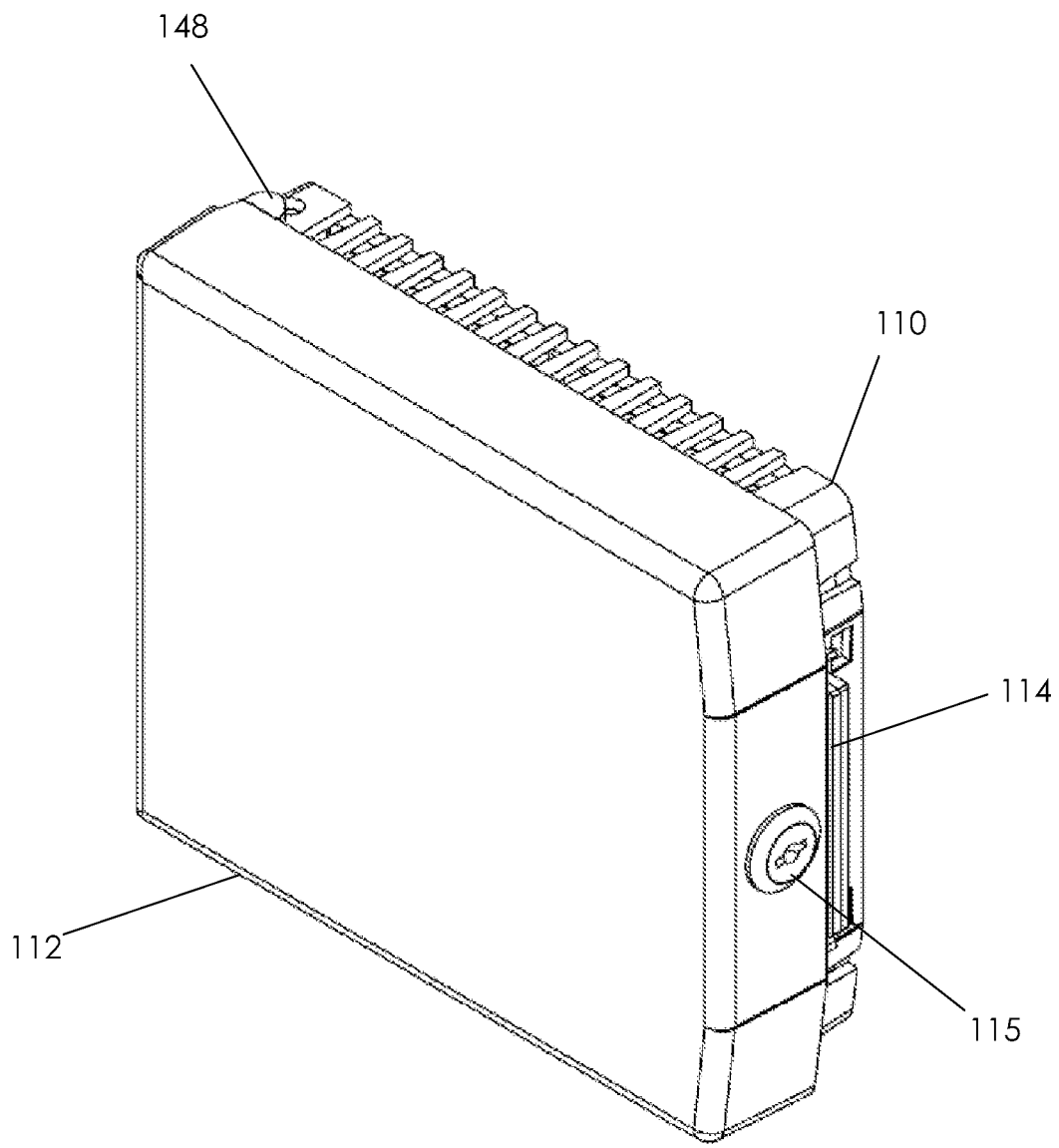
FIG. 2 is an illustration of a perspective view of a thermostat cover in a closed position in the middle depth orientation.

FIG. 2 illustrates an implementation of a closed thermostat cover assembly 100 in a middle volume position, which creates a middle volume interior space within the thermostat cover assembly 100. To accomplish this, the user mounts the lid 112 to the base 110. The lid 112 has pivot points or hinge members 148 that engage one of the plurality of mounting holes in the base 110, for example in this implementation, the second (middle) mounting hole 122. The mounting holes are provided on the top and bottom walls of the base 110 to accommodate the hinge members 148 that provide a cooperating top pivot point and bottom pivot point for the lid 112 on the base 110. The hinge members 148 may each comprise a raised bump constructed to engage one of the plurality of mounting locations. The hinge members 148 can also be pegs (see FIG. 7) constructed to engage one of the plurality of mounting locations 121, 122, 123.

As shown in FIG. 2, the lid 112 is secured to the second (middle) mounting hole 122. The user then selects and positions the locking tab 114 into the corresponding second (middle) locking tab position 132 so that when the lid 112 is closed, the thermostat cover assembly 100 forms and enclosed volume of interior space to house the thermostat. The thermostat cover assembly 100 can similarly be adjusted to form other interior volumes, greater and lesser, by selecting and connecting the lid 112 to different mounting holes with corresponding locking tab positions. For example, using the first (widest) mounting hole 121 and the first locking tab position 131 creates the largest volume of interior space in the thermostat cover assembly 100 to accommodate the largest thermostat therein. Using the third mounting hole 123 and the corresponding locking tab position 133 creates the least volume interior space for a smaller thermostat. Advantageously, the thermostat cover assembly 100 may be adjusted to protect and prevent access to thermostats of different thicknesses and sizes while limiting the amount of room space required.

FIG. 3 illustrates an implementation of the thermostat cover assembly 100 open and in the middle position. As can be seen, the lid 112 is pivotable about the mounting holes 122 after the lock 115 is rotated to the unlocked position. In this implementation shown, the lock 115 is positioned in the locked state because the hook 140 is positioned downward.

Figure 5:
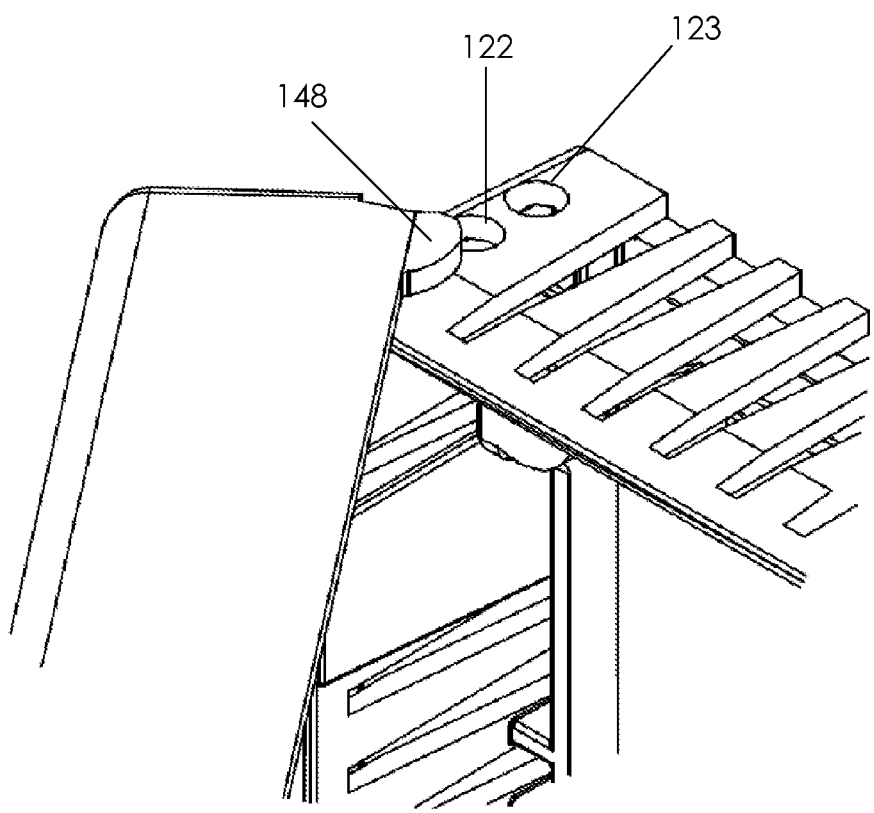
FIG. 5 is an illustration of a an enlarged view of a lid mounted in a widest depth position mounting hole.

FIG. 4 is similar to FIG. 3, except the locking tab 114 is removed. FIGS. 5 and 6 illustrate larger views of the attachment areas. Specifically, in FIG. 5, the widest or first mounting hole 121 is being utilized in an implementation to secure a wider thermostat therein. Further, the locking tab 114 is located at the widest or first locking tab position 131 to accommodate a wider thermostat. The locking tab positions are sized and shaped to receive releasable clips 150 formed on the locking tab 114. The user simply inserts the locking tab 114 until the clips 150 snap into position within the base 110. To remove the locking tab 114, the user simply compresses the releasable clips 150. Advantageously, the locking tab 114 is constructed and arranged so that the removable clips 150 can only be accessed when the thermostat cover assembly 100 is in the open position and therefore prevents unauthorized removal of the locking tab 114. The protrusion 136 fits within corresponding protrusion slots 151, 152, 153 formed in the base 110. The slots are arranged so that when the releasable clips 150 of the locking tab 114 are inserted into one of the sets of the locking tab positions 131, 132, 133, the protrusion 136 fits within a corresponding slot 151, 152, 153, respectively. This provides greater security, rigidity and alignment to the locking operation of the thermostat cover assembly 100.

Figure 7:
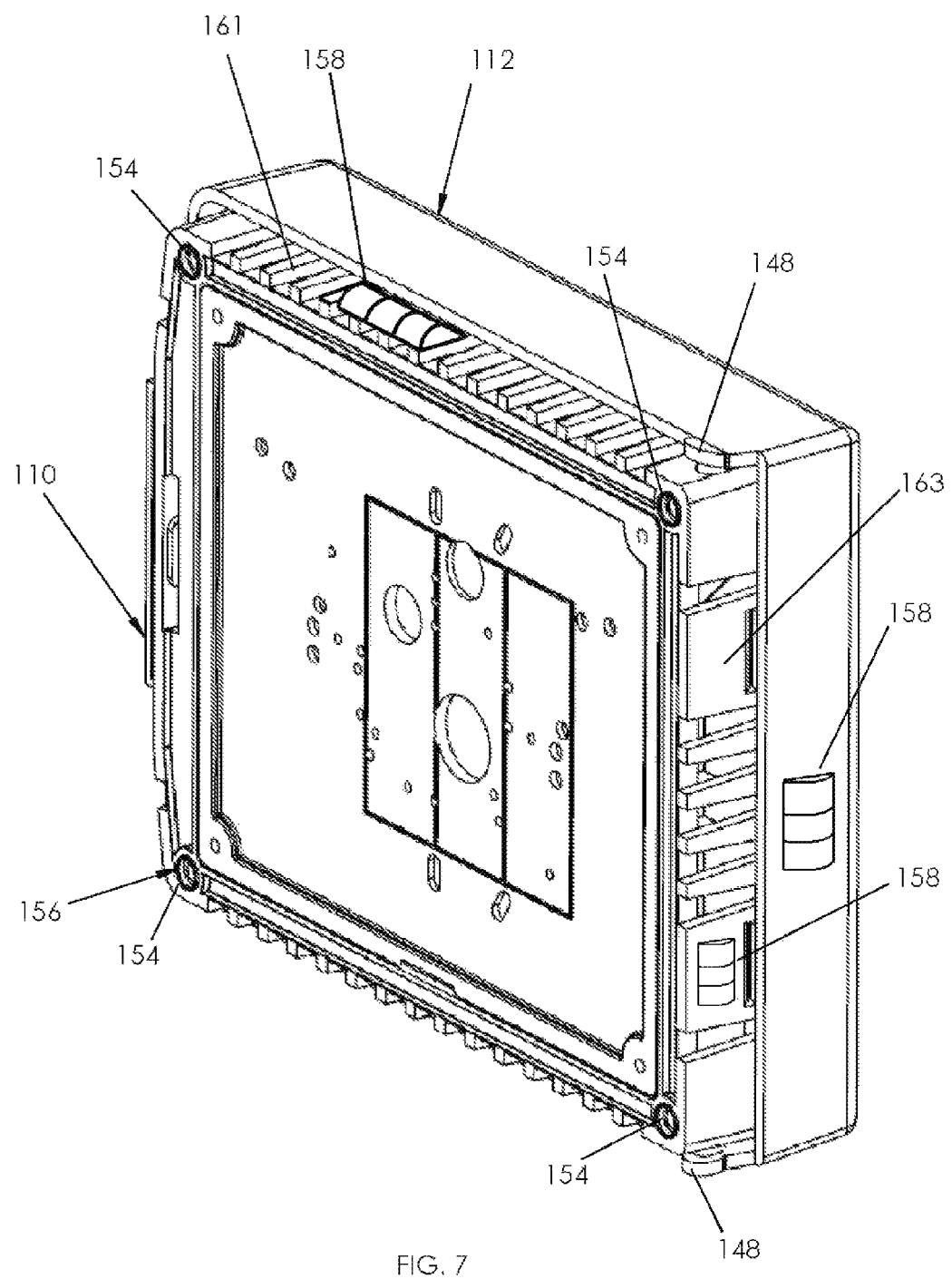
FIG. 7 is an illustration of a rear perspective view of the thermostat cover base showing a plurality of detents for marking a wall.

FIG. 7 illustrates an implementation of a rear view of the thermostat cover assembly 100 with detents 154 encircling mounting plate apertures 156. In operation, the user positions the thermostat base 110 against the wall at the desired position and presses against the wall to leave alignment marks from the detents 154. Advantageously, the marks left on the wall can then be drilled out to perfectly position the thermostat cover assembly 100. An additional option is to include at least one bubble level 158 with the thermostat cover assembly 100 which can be located on the thermostat cover assembly 100 during installation to ensure that the cover is properly level. The bubble level 158 is shown on the first wall 161 and the third wall 163 of the base 110. Alternatively, the lid 112 and/or the base 110 may include one or more permanently mounted bubble levels to ease operation.

Referring back to FIG. 1, an implementation of a thermostat cover assembly 100 is shown. Thermostat cover assembly 100 includes the base 110 with a first wall 161, a second wall 162 that is substantially parallel to first wall 161. The base 110 also includes a third wall 163 and a fourth wall 164 that is substantially parallel to third wall 163. Third wall 163 and fourth wall 164 are substantially perpendicular to both first wall 161 and second wall 162. The base 110 also includes an aperture 165 through a back side 166 of the base 110 which is large enough to receive at least a portion of a thermostat therethrough.

With reference to FIG. 1 and FIGS. 3-6, certain details of an implementation of a thermostat cover assembly 100 are shown. In FIGS. 2 and 3, the lid 112 is hingedly coupled to the base 110. The pivot points or hinge members 148 on the lid 112 are coupled to the second (center) mounting hole 122 located on the first wall 161 and the second wall 162 of the base 110. FIG. 2 shows the lid 112 in a closed position, and FIG. 3 shows the lid 112 in an open position. As shown in FIG. 3, lid 112 is pivoted at the third wall 163 in order to access the thermostat being covered.

The hinge members 148 may be in the form of a raised bump positioned to engage one of the selected mounting holes 121, 122, 123. The hinge members 148 may also be a peg or other shape that couples into one of the selected mounting holes 121, 122, 123 and allows rotation of the lid 112. The hinge members 148 engage the selected mounting hole 121, 122, 123 based upon the depth of the thermostat cover assembly 100 desired to appropriately enclose thermostats of various sizes. When the hinge members 148 are coupled to the selected mounting hole 121, 122, 123, in various other positions, the result being multiple depths of the assembly 100 being selectable. For example, FIGS. 4 and 5 show the hinge members 148 coupled into the first (widest) mounting hole 121. This defines the greatest volume of enclosure for the thermostat cover assembly 100. FIGS. 2 and 3 show the hinge member 170 coupled into the second (center) mounting hole 122. This defines the middle volume of enclosure for the thermostat cover assembly 100. FIG. 7 shows the hinge member 170 coupled into the third (narrowest) mounting hole 123. This defines the smallest volume of enclosure for the thermostat cover assembly 100.

Also shown in FIGS. 1-4 is the lock 115. The lock 115 may be in the format of any number of locks known in the art or which may be developed in the future. It should be understood that lock 115 interacts with the locking tab 114 to prevent movement of lid 112 when in a locked position. In one particular implementation as shown in FIG. 6, the locking tab 114 includes the protrusion 136 with the slot 138 that is arranged to receive the hook 140 on the lock 115 when the lock 115 is in a locked condition. When the lock 115 is engaged, the hook 140 portion of lock 115 couples with the slot 138, preventing movement of lid 112.

FIG. 3 shows the lock 115, which serves to prevent the lid 112 of the thermostat cover assembly 100 from being opened. In such a configuration, the hook portion 140 of the lock 115 would interface with a portion of locking tab 114 located in one of the plurality of locking tab positions 131, 132, 133 in the fourth wall 164 of the base 110 when in a locked closed position (as shown in FIGS. 2 and 7), preventing the opening of the lid 112 of the thermostat cover assembly 100 to unauthorized personnel. The hook portion 140 of the lock 115 may interface with the protrusion 136 or the slot 138. In implementations of the thermostat cover assembly 100, the hook portion 140 may also be configured with the lock 115 to be in a position wherein the hook portion 140 opens upward as shown in FIG. 1 or an open downward position as shown in FIGS. 3 and 4. In an implementation, the locking tab 114 may be configured so that the slot 138 in the protrusion 136 is on the top and the hook portion 140 of the lock 115 engages with the slot 138.

The concepts disclosed herein are not limited to the specific implementations shown herein. For example, it is specifically contemplated that the components included in a particular implementation of a thermostat device cover may be formed of any of many different types of materials or combinations that can readily be formed into shaped objects and that are consistent with the intended operation of a thermostat cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the thermostat covers, lids, bases, and any other components forming a particular implementation of a thermostat cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a thermostat cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A thermostat cover assembly comprising:
a base comprising a first wall and a second wall substantially parallel to each other and a third wall and a fourth wall substantially parallel to each other, wherein the third wall and fourth wall are substantially perpendicular to each of the first wall and second wall, the base further comprising an aperture in a back side large enough to receive at least a portion of a thermostat therethrough,
wherein each of the first wall and the second wall of the base further comprises a plurality of mounting locations and the fourth wall of the base further comprises a plurality of locking tab locations;
a locking tab selectively positionable in one of the plurality of locking tab locations; and
a lid adjustably mountable on the base at a front side of the base, wherein the lid comprises a first pivot point configured to engage one of the plurality of mounting locations on the first wall of the base, a second pivot point configured to engage one of the plurality of mounting locations on the second wall of the base, and a closing member configured to engage the locking tab on the fourth wall of the base.

2. The thermostat cover assembly of claim 1 wherein the plurality of mounting locations comprise holes.

3. The thermostat cover assembly of claim 1 wherein the first pivot point and second pivot point each comprise a raised bump constructed to engage one of the plurality of mounting locations.

4. The thermostat cover assembly of claim 1 wherein the first pivot point and second pivot point each comprise a peg constructed to engage one of the plurality of mounting locations.

5. The thermostat cover assembly of claim 1 wherein the closing member further comprises a lock located on the lid, wherein the lock interfaces with the locking tab to prevent movement of the lid when the lock is in a locked position.

6. The thermostat cover assembly of claim 1 wherein the locking tab further comprises releaseable clips, wherein the clips are removably insertable into the plurality of locking tab locations.

7. The thermostat cover assembly of claim 1 wherein the locking tab further comprises a protrusion with a slot, wherein the closing member engages the slot in the protrusion.

8. The thermostat cover assembly of claim 1 further comprising
a mounting plate constructed to secure the thermostat thereto.

9. The thermostat cover assembly of claim 8 wherein the base further comprises holes arranged to align with holes in the mounting plate such that mounting screws may traverse both the base and the mounting plate to secure the thermostat cover assembly to a wall.

10. The thermostat cover assembly of claim 1 further comprising
a plurality of detents formed in the base.

11. The thermostat cover assembly of claim 1 further comprising
a level.

12. The thermostat cover assembly of claim 1 wherein the base further comprises a level.

13. A thermostat cover assembly comprising:
a base comprising a first wall and a second wall substantially parallel to each other and a third wall and a fourth wall substantially parallel to each other, wherein the third wall and fourth wall are substantially perpendicular to each of the first and second wall, the base further comprising an aperture in a back side large enough to receive at least a portion of a thermostat therethrough; and
a lid comprising a first pivot point configured to engage one of a plurality of mounting locations on the first wall of the base and a second pivot point configured to engage one of a plurality of mounting locations on the second wall of the base, the plurality of mounting locations extending at least a portion of a distance between the back side of the base and a front side of the base,
the lid further comprising a closing member configured to engage a selectively positionable locking tab, and
wherein the lid is positionable at a first position wherein the assembly comprises a first depth, and a second position wherein the assembly comprises a second depth which is greater than the first depth.

14. The thermostat cover of claim 13 wherein
the lid is positionable at a third position wherein the assembly comprises a third depth which is greater than the second depth.

15. The thermostat cover assembly of claim 13 further comprising
a lock configured to prevent the movement of the lid when in a locked position.

16. A method of selectively enclosing a thermostat of a particular depth with a thermostat cover assembly to a corresponding depth, the assembly comprising a base, a locking tab, and a lid, wherein the base comprises a first wall and a second wall each having a plurality of connection points, a third wall, and a fourth wall having a plurality of locking tab positions, and the lid comprises a first pivot point configured to engage one of the plurality of mounting locations on the first wall of the base, a second pivot point configured to engage one of the plurality of mounting locations on the second wall of the base, and a closing member configured to engage the locking tab, the method comprising the steps of:
placing the base around the thermostat;
selecting one of the plurality of connection points based upon the corresponding depth of the thermostat;
coupling the hinge member of the lid to the selected one of the plurality of connection points on the base to selectively enclose the thermostat to a corresponding depth;
selecting one of the plurality of locking tab positions based upon the corresponding depth of the thermostat; and
inserting the locking tab into the selected one of the plurality of locking tab positions.

17. The method of claim 16 further comprising
coupling the closing member to the locking tab to secure the lid in a closed position.

18. The method of claim 16 wherein the base further comprises a plurality of detents, the method further comprising the steps of:
pressing the base against a wall at a desired mounting location for the thermostat; and
drilling mounting holes at the locations of the marks on the wall created by the detents.

19. The method of claim 16 wherein the base further comprises a level, the method further comprising the steps of:
positioning the base against a wall at a desired mounting location for the thermostat; and
using the level to determine a level mounting position before mounting the assembly to a wall.

* * * * *